(12) United States Patent
Westcott

(10) Patent No.: US 7,159,356 B2
(45) Date of Patent: Jan. 9, 2007

(54) FISHING HOOK STORAGE DEVICE

(76) Inventor: Mike Westcott, 3111 45th St., Suite 7, West Palm Beach, FL (US) 32246

( * ) Notice: Subject to any disclaimer, the term of this patent is extended or adjusted under 35 U.S.C. 154(b) by 384 days.

(21) Appl. No.: 10/147,842

(22) Filed: May 17, 2002

(65) Prior Publication Data

US 2004/0194366 A1    Oct. 7, 2004

(51) Int. Cl.
*A01K 87/00* (2006.01)

(52) U.S. Cl. .................... 43/25.2; 43/57.1; 43/57.2

(58) Field of Classification Search ............ 43/25, 43/23.2, 54.1, 57.1, 57.2, 25.2; 206/464, 206/467
See application file for complete search history.

(56) References Cited

U.S. PATENT DOCUMENTS

| | | | | |
|---|---|---|---|---|
| 1,577,566 A | * | 3/1926 | Cryder | 43/57.2 |
| 1,733,971 A | * | 10/1929 | Kremer | 206/208 |
| 1,999,779 A | * | 4/1935 | Perrine | 43/57.2 |
| 3,453,770 A | * | 7/1969 | Schultz | 43/57.1 |
| 3,461,599 A | * | 8/1969 | Sylvester | 43/57.1 |
| 3,769,741 A | * | 11/1973 | Hessler et al. | 43/57.1 |
| 3,881,273 A | * | 5/1975 | Herring | 43/57.1 |
| 4,073,085 A | * | 2/1978 | Stremeckus | 43/54.1 |
| 4,208,825 A | * | 6/1980 | Barnes | 43/57.1 |
| 4,452,003 A | * | 6/1984 | Deutsch et al. | 43/25.2 |
| 4,614,054 A | | 9/1986 | Fovenyessy | |
| 4,728,052 A | * | 3/1988 | Yeh | 242/313 |
| 4,884,357 A | | 12/1989 | Clifford | |
| 5,079,863 A | * | 1/1992 | Gillespie | 43/54.1 |
| 5,123,199 A | | 6/1992 | Lysohir et al. | |
| 5,143,218 A | * | 9/1992 | Brauckmann | 206/467 |
| 5,157,862 A | * | 10/1992 | Companiony | 43/57.2 |
| 5,170,582 A | * | 12/1992 | Morgin et al. | 43/54.1 |
| 5,234,107 A | * | 8/1993 | Morel et al. | 206/462 |
| 5,241,773 A | * | 9/1993 | Burgh | 43/18.1 HR |
| 5,297,354 A | * | 3/1994 | McGriff | 43/4 |
| 5,339,554 A | * | 8/1994 | Lippens | 43/4 |
| 5,407,066 A | * | 4/1995 | Grange | 206/228 |
| 5,452,538 A | * | 9/1995 | Trefiak | 43/25.2 |
| 5,501,030 A | | 3/1996 | Markle, Jr. | |
| 5,555,671 A | * | 9/1996 | Voight et al. | 43/57.1 |
| 5,632,113 A | * | 5/1997 | Raymond et al. | 43/54.1 |
| 5,704,158 A | * | 1/1998 | Whiteaker | 43/57.1 |
| 5,775,516 A | * | 7/1998 | McCumber et al. | 206/470 |
| 5,787,635 A | | 8/1998 | Lin et al. | |
| 6,256,925 B1 | * | 7/2001 | Blackburn | 43/57.1 |
| 6,301,825 B1 | * | 10/2001 | Doreian | 43/57.1 |
| 2003/0182845 A1 | * | 10/2003 | Pfeffer | 43/57.1 |

* cited by examiner

*Primary Examiner*—Kurt Rowan
(74) *Attorney, Agent, or Firm*—McHale &Slavin PA

(57) ABSTRACT

The instant invention is a fishing rig storage device that maintains multiple hooks in a secure storage position until use. The storage device consists of a containment vessel that houses six individual storage boxes during shipping. Each storage box has a cavity housing a foam insert and a hinged top allowing individual sealing of the six boxes. The individual storage boxes are used to store the unused hook. In an alternative embodiment the containment vessel can also be used to hold the storage box and hook in instances of high rod movements. The containment vessel includes aperture that allows the containment vessel and storage housings to remove any pressure from the fishing line during storage.

5 Claims, 2 Drawing Sheets

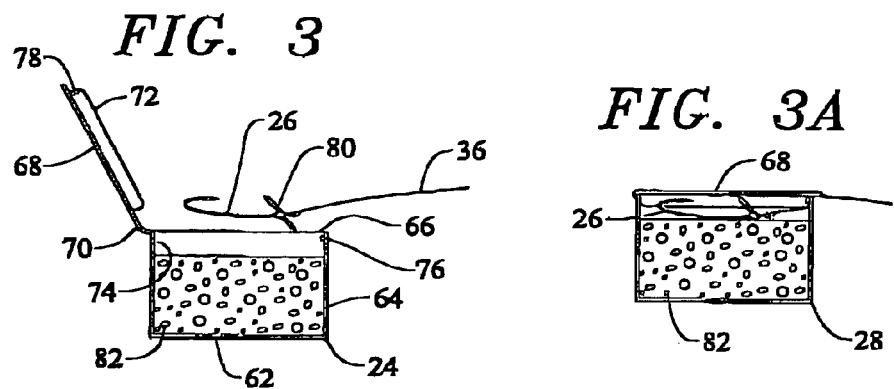
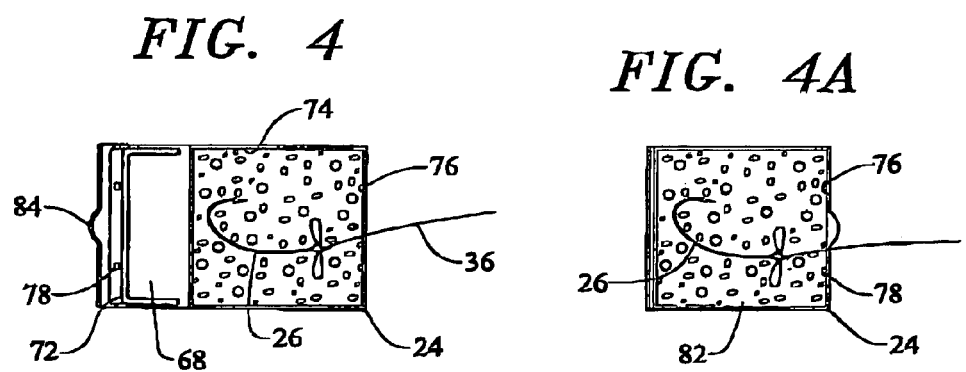
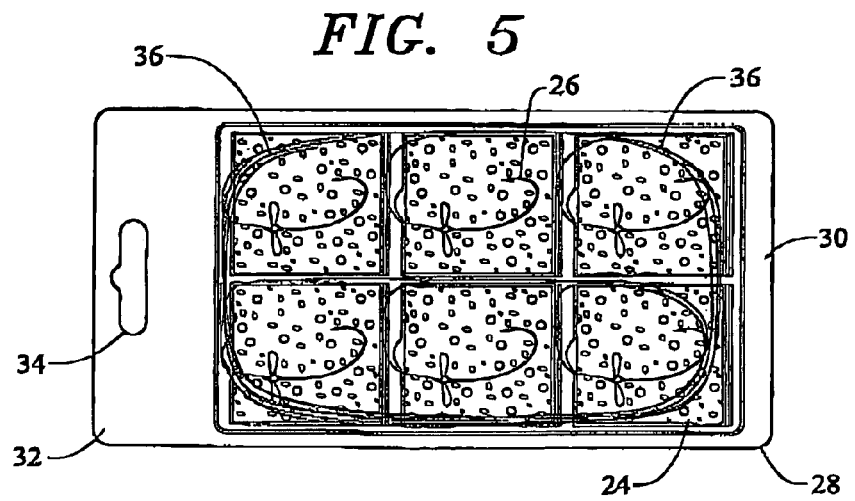

//FISHING HOOK STORAGE DEVICE

FIELD OF THE INVENTION

This invention relates generally to the field of fishing and more particularly to a storage device for use in securing multiple fishing hooks.

BACKGROUND INFORMATION

The use of multiple hook rigging, commonly referred to as a jig line, for catching bait fish is well-known. Typically a jig line consists of a fishing line with a numerous small, shinny, spaced-apart that are hooks attached by short leader which extend outward from a common line. In practice the assembly is placed over the side of a boat where bait fish may reside. The jig line is moved up and down wherein the hooks attract the bait fish. Enhanced hooks may have a gold or silver color and a small feather or the like attractant to assist in luring of the bait fish. It is not uncommon for two or more bait fish to swallow the unbaited hooks allowing quick retrieval. The bait fish are then used for catching larger fish, such as dolphin, tuna, marlin, and so forth. Most fisherman have found the use of this rigging a most effective way to obtain bait fish versus net casting or single hooks catches.

A problem occurs when the rigging is not in use. As previously mentioned the hooks extend outwardly from a common line and simply dangle when not in use. The hooks may tangle with other hooks, or catch a person's clothing or skin. For example, when a multiple hook rigging is used with a conventional fishing pole, the hooks each dangle from the main line and are subject to the wind and/or movement of the boat. In close quarters, the hooks can easily attach to a persons clothing or skin if an individual brushes against the exposed hooks. If the exposed hooks are rolled into a storage position, the hooks can become so entangled that they are nearly impossible to re-use. Various attempts have been made and patented in an attempt to address this problem.

U.S. Pat. No. 5,501,030 discloses a fishing hook holder which consists of a substantially tubular shaped member having an interior subdivided into individual compartments. Each compartment is sized to accommodate the point of at least one hook.

U.S. Pat. No. 5,787,635 discloses a fishing hook apparatus that allows a plurality of hooks to be placed within a single container. The use of a threaded top for which a hook can be positioned to allow for ease in tying of a fishing line to the eye hook. This invention is not suitable for hooks that are tied together such as those found on a Sabiki rig.

U.S. Pat. No. 5,123,199 discloses a hook protector which consists of a hollow housing configured to hold various types of hooks. For instance, FIG. 9 sets forth a hook that is placed within a closeable housing for protection of the hook, allowing the eyelet to remain free. Similarly FIGS. 12 and 13 depict an open enclosure having a means for securing a hook in position and a concealed area for the barb to prevent contact with the hook.

U.S. Pat. No. 4,614,054 discloses another fish hook protector cover. In this patent the enclosure is a flexible housing having a conformable material that can be used to surround the barb hooks. This is designed for use with a multiple barb hook to protect each barb from coming in contact with the user.

U.S. Pat. No. 4,452,003 discloses yet another housing having hingedly connected housing halves that allow the housing to be opened and the hook placed therein for securement. This patent is similar to U.S. Pat. No. 4,884,357 and includes an end loop for attaching to a fishing pole.

U.S. Pat. No. 5,241,773 discloses a hollow fishing rod used to store hooks. However, the use of a speciality rod prohibits the rod from being used for conventional fishing.

Thus, what is needed is a means for storing gang style fishing hooks when not in use.

SUMMARY OF THE INVENTION

The instant invention is a fishing rig storage device that maintains multiple hooks in a secure storage position until use. The storage device consists of a containment vessel housing six individual storage boxes. Each storage box defines a cavity which houses a foam insert. A hinged top allows sealing of the individual boxes. The storage boxes are sized to fit within the larger containment vessel. The containment vessel includes a hanging hook for shipping and storage, and may also be use to remove pressure from the fishing line during rod storage.

The individual storage boxes are used to secure individual hooks such as those found on a SABIKI rig. The insert has a primary function of securing the hook but may also be treated with a moisture removal substance, an oil to prevent degradation of the hook, or even a fish attractant. The individual boxes securely hold the barbed ends of the hook so as to eliminate any possibility of the hooks attaching themselves to an individuals clothing, skin or becoming entangled with another fishing line. In the preferred embodiment, the storage boxes are left to hang freely on the pole. In an alternative embodiment, the containment vessel can be used to prevent entanglement of the individual storage boxes in instances of high rod movement such as in high seas or transporting to/from the boat. The containment vessel further operates as both an original shipping container and as a subsequent hanger to prevent excess line pressure. The leader lines for the individual storage boxes may be placed into the containment vessel for shipping or only a single common line may extend outward from the containing vessel when stored on a fishing rod.

Thus, an objective of the instant invention is to provide storage for multiple hooks found on a gang style bait fish system such as the SABIKI rig.

Yet another objective of the instant invention is to include a sponge rubber insert within storage container that can be used for purposes of hook positing, moisture extraction, moisture dissipate by oil, or for marinating portions of the hook.

In another objective of the instant invention is to prevent tangling of the leader lines use on gang style fishing lines.

Still another objective of the instant invention is to eliminate all stress from the fishing hook assembly by use of a containment vessel which includes a mounting mechanism for securing the containment vessel to a conventional fishing pole.

Yet still another objective of the instant invention is to provide an inexpensive means for maintaining multiple gang hooks in a configuration so as to prevent entanglement and further provide a simplified storage system wherein the shipping container operates as the containment vessel.

Other objectives and advantages of this invention will become apparent from the following description taken in conjunction with the accompanying drawings wherein are set forth, by way of illustration and example, certain embodiments of this invention. The drawings constitute a

BRIEF DESCRIPTION OF THE DRAWINGS

FIG. 3 is a side view of an individual container vessel in an open position;

FIG. 3A is a side view of an individual container vessel in a closed position;

FIG. 4 is a top view of an individual container vessel in an open position;

FIG. 4A is a top view of an individual container vessel in a closed position; and FIG. 5 is a top view of the containment vessel housing the individual storage containers.

DETAILED DESCRIPTION

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1A:
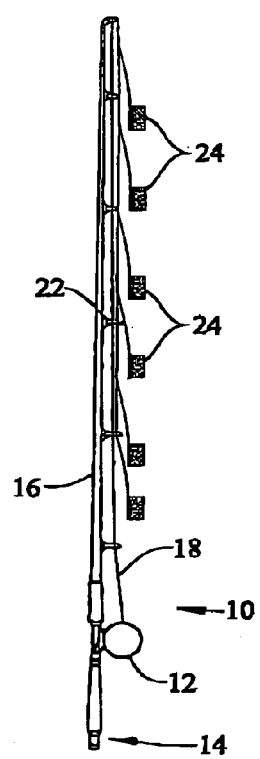
FIG. 1A is pictorial view of a fishing rod having the storage container of the instant invention illustrated with hooks stored in individual storage containers.

Now referring to FIG. 1A, set forth is a pictorial view of a fishing rod 10, having a reel 12, handle 14, pole 16, fishing line 18. The pole 16 has a series of eyelets 22, allowing for directional placement of the line 18, from the reel 12. The storage device consists of a plurality of individual storage containers 24, in a preferred embodiment there are six storage containers. The storage containers 24 are constructed of plastic and may be either opaque or translucent. Individual hooks 26 are placed within the storage containers 24, where they are held securely in position until use. In the preferred embodiment the storage containers 24 are left to hang freely wherein the individual fishing hooks are secured within each housing which eliminates the possibility of hook engagement.

Figure 1B:
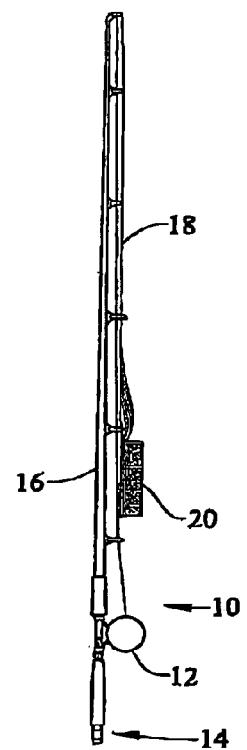
FIG. 1B is pictorial view of a fishing rod having the storage container of the instant invention illustrated with hooks stored in individual storage containers and the containers placed within a containment vessel secured to a rod.
Figure 1C:
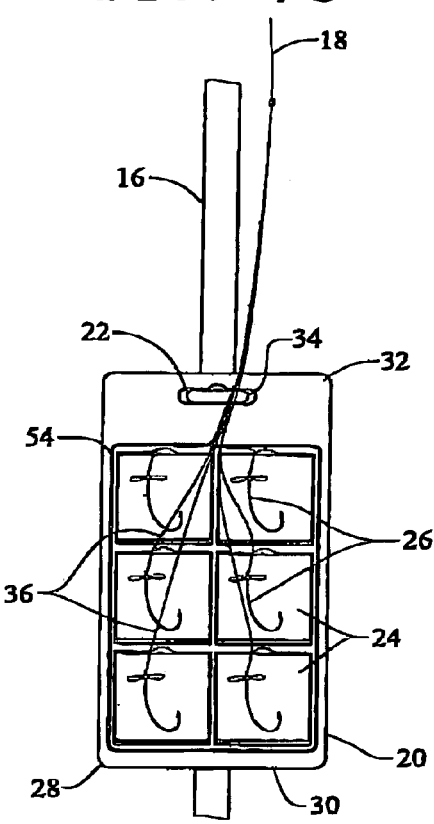
FIG. 1C is a front view of the containment vessel taken as a partial view from FIG. 1B illustrating the containment of the individual storage containers.

In an alternate embodiment, as shown in FIGS. 1B and 1C, the storage containers 24 are shown within a containment vessel 20, having a planar flange 30 which is extended on one end 32 allowing for an aperture 34 for use in hanging the vessel from an eye hook 22 of the pole 16. The individual hooks 26, such as those found in a SABIKI rig, each having a leader line 36 extending from the hook to a common fishing line 18. As will be further explained later in this specification, the leader lines 36 may be placed within the containment vessel 20 for shipping or attached to a common fishing line 18 wherein the common fishing line 18 extends out of the containment vessel. An example of a jig line formed from a plurality of hooks and leaders is disclosed in U.S. Pat. No. 5,241,773. Alternatively, the leader lines may extend outward from the containment vessel as illustrated for temporary storage. The containment vessel may also be made of a transparent or opaque material, a clear container allows the fisherman to visually inspect the leader lines and hooks for damage such as crimping, rust, or other degradation before usage. This embodiment secures the storage vessels when the fishing rod is subjected to high amounts of movement during high seas or transport.

Figure 2:
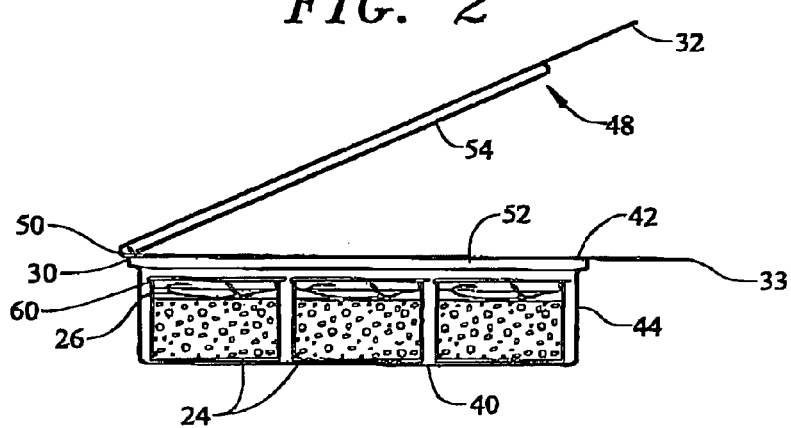
FIG. 2 is a side view of FIG. 1 the containment vessel housing the individual storage containers.

FIG. 2 depicts the containment vessel 28 having a closed bottom 40, with an open top 42, and contiguous walls 44 extending between the closed bottom 40 and the open top 42. The open top 42 is surrounded by the planar flange 30, including the elongated end flange 33 for housing of the previously mentioned aperture. A top 48 is secured to one of the continuous side walls by a living hinge 50. A living hinge being defined as a hinge formed from the same material as the bottom section and top during manufacturing. The top 48 is surrounded by a planar flange, similar to flange 30, including an elongated end flange 32, as illustrated in FIGS. 1C 2 and 5. The open top 42 includes a receptacle groove 52 located around the peripheral which is receptive to a reciprocal protrusion 54 located on the top 48. The protrusion 54 frictionally engages the receptacle groove 52 so as to securely fasten the top 48 to the lower half of the containment vessel. The planar flange of the top 48 engages the planar flange 30 of the open top 42 in a juxtaposed relationship, as illustrated in FIGS. 1C and 5, when the top 48 encloses the lower half of the containment vessel. The individual storage containers 24 are shown in the side view with the hooks 26 captured within the container beneath the top 60.

FIGS. 3–4 sets forth a view of a container 24 having a bottom 62, and contiguous side walls 64 leading to an open top 66. As with the containment vessel the storage container 24 includes a top 68, formed integral to the bottom portion of the storage container by use the living hinge 70. In a preferred embodiment the storage container includes a lip 72 which frictionally engages the inner side wall 74 of the container 24. A protrusion tab 76 is available for locking of the lid of the top 68 upon insertion to indentation 78. The hook 26 is depicted with a attractant lure such as a feather 80 all of which is hooked to leader line 36.

FIG. 3A depicts storage box 28 having the foam rubber insert 82 slightly compressed by the hook 26, being pushed against the insert 68. The insert may include a moisture remover, an oil substance, or even a bait attractant all of which can be used for conditioning of the hook while in storage. FIG. 4 further illustrates the top 68 having a lip 72, extending around three edges of the top with indents 78 available for locking to the tabs 76. The top includes a lifting tab 84 for ease of lifting the top 68 after it has been secured to the lower half of the container. FIG. 4A depicts the storage container 24 with hook 26 firmly secured within the housing. Tabs 76 are shown within the receptacle 78 for locking of the top in position. The insert 82 may also be a cloth, cotton or any other type of packing that securely holds the hook 26 in position. For instance, if the jig is used for salt water the material may include an oil based substance to prevent premature rusting of the hook if the fisherman decides to postpone rinsing of the hooks or decides not to rinse at all.

FIG. 5 depicts the containment housing 28 with the individual storage containers 24 placed therein. The hooks 26 and leaders 36 are all shown within the housing in a manner that allows prepackaging by the manufacturer of the hooks with the leader lines and the storage device. The aperture 34 allows the containment vessel to be the original shipping vessel and stored over a peg hook commonly found in retail stores.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

I claim is:

1. A multi hook bait fishing assembly comprising:
   a jig defined as a common line, more than one leader spaced apart and permanently attached to said common line at one end of each of said leaders, a bait hook attached to the other end of each of said leaders;
   more than one hook enclosing storage container of unitary construction and of a size and shape to house an individual one of said bait hooks, each said storage container having a closed bottom, an open end, walls extending between said closed bottom and said open end and a top secured to one of said walls by a living hinge, said top constructed and arranged to close said open end, an individual one of said bait hooks disposed within each said storage container, a hook positioner foam insert located in each said storage container constructed and arranged to secure said bait hook in a fixed position, said foam insert adapted to contain an oil-based rust inhibitor;
   a containment vessel constructed and arranged to house all of said storage containers, said containment vessel having a closed bottom, an open end, walls extending between said closed bottom and said open end, a first planar flange extending outwardly from said open end, a top secured to one of said walls with a living hinge and including a second planar flange extending outwardly therefrom, said second planar flange being constructed and arranged to substantially engage in juxtaposed relationship said first planar flange when said top of said vessel encloses said open end of said containment vessel whereby said jig is securely stored when not in use;
   each of said planar flanges having an elongated end flange including an aperture, wherein said apertures are available for holding said storage device on a fixed protrusion.

2. The fishing assembly according to claim 1 including a moisture removing compound.

3. The fishing assembly according to claim 1 including a bait attractant.

4. The fishing assembly according to claim 1 wherein said first planar flange extends around the periphery of said walls, said first planar flange having a receptacle groove formed therein and a reciprocal protrusion formed integral to said top, said protrusion forming a friction fit to said groove.

5. The fishing assembly of claim 1 wherein said foam insert contains an oil-based rust inhibitor.

* * * * *